US012059797B2

(12) United States Patent
Liou

(10) Patent No.: US 12,059,797 B2
(45) Date of Patent: Aug. 13, 2024

(54) TOOL WITH SEGMENTED TOOL HANDLE

(71) Applicant: Tang Chou Industrial Co., Ltd., Nantou County (TW)

(72) Inventor: Mou-Tang Liou, Taichung (TW)

(73) Assignee: TANG CHOU INDUSTRIAL CO., LTD., Nantou County (TW)

( * ) Notice: Subject to any disclaimer, the term of this patent is extended or adjusted under 35 U.S.C. 154(b) by 79 days.

(21) Appl. No.: 17/994,542

(22) Filed: Nov. 28, 2022

(65) Prior Publication Data

US 2024/0173842 A1 May 30, 2024

(51) Int. Cl.
*B25G 3/26* (2006.01)
*B25G 1/04* (2006.01)

(52) U.S. Cl.
CPC ................. *B25G 1/04* (2013.01); *B25G 3/26* (2013.01)

(58) Field of Classification Search
CPC . B25G 3/26; B25G 1/04; F16B 35/005; F16B 7/042; Y10T 403/55
USPC ............................ 411/393, 394; 16/427, 429
See application file for complete search history.

(56) References Cited

U.S. PATENT DOCUMENTS 8,315 A * 8/1851 Niles ........................ B25G 3/26 279/71
572,851 A * 12/1896 Young ..................... F16B 4/004 16/427
577,220 A * 2/1897 Whitehead ................. B25J 1/04 24/339
1,185,732 A * 6/1916 Swayne ................... B25G 1/04 15/144.4
1,327,597 A * 1/1920 Greene ..................... B25G 1/04 279/93
2,291,593 A * 7/1942 Hubbard .................. B25G 1/04 294/174
2,482,695 A * 9/1949 Shearer ...................... B25B 9/00 76/36
2,738,815 A * 3/1956 Hoeldtke ................. B25G 1/04 30/308.1
2,974,965 A * 3/1961 Welles, Jr. ............... B23G 1/46 411/315
3,118,696 A * 1/1964 Resare ................ B25B 23/0035 81/177.85
3,449,003 A * 6/1969 Hunt ........................ E03F 9/002 403/324
3,864,048 A * 2/1975 Parker ..................... F16B 7/105 403/328
3,980,409 A * 9/1976 Turner ................. H01H 31/006 403/328

(Continued)

*Primary Examiner* — Jeffrey O'Brien
(74) *Attorney, Agent, or Firm* — MUNCY, GEISSLER, OLDS & LOWE, P.C.

(57) ABSTRACT

A tool with a segmented tool handle includes a first tube, a second tube and a limiting seat. The first tube has a first inner hole and a first fastening hole. The second tube has one end inserted into the first inner hole, a second inner hole and a second fastening hole. The limiting seat is disposed in the second inner hole and connected with a fastener. An end of the fastener is threadedly connected to the limiting seat and the other end of the fastener has a conical abutting portion. The abutting portion abuts against an inner periphery of first fastening hole when the fastener is in a fastened position. The abutting portion detaches from the first fastening hole when the fastener is in a unfastened position.

9 Claims, 7 Drawing Sheets

(56) References Cited

U.S. PATENT DOCUMENTS 4,047,821 A * 9/1977 Hoke ........................ H02G 1/02 403/328
4,074,923 A * 2/1978 Howe, Jr. ............. F16D 1/0847 403/362
4,372,703 A * 2/1983 Szostak .................... B25G 3/18 403/324
4,385,849 A * 5/1983 Crain ....................... F16B 7/105 343/901
4,587,864 A * 5/1986 Kassai ...................... B62B 9/20 403/379.3
5,083,883 A * 1/1992 Ueda ........................ B25G 3/26 403/379.5
5,105,493 A * 4/1992 Lugtenaar ................ B25G 3/14 7/116
5,255,993 A * 10/1993 Kovacs ................... F16B 7/042 403/328
5,375,938 A * 12/1994 Bartlow ................... B25G 1/04 403/14
5,515,574 A * 5/1996 Larson ..................... B25G 1/04 15/144.4
5,692,856 A * 12/1997 Newman, Jr. ............ B25G 1/04 403/109.5
5,752,415 A * 5/1998 Tsai ......................... B25G 1/04 16/429
5,779,386 A * 7/1998 Eichhorn .............. F16B 7/0413 403/328
5,797,918 A * 8/1998 McGuire ............ A61B 17/1714 606/104
5,951,078 A * 9/1999 Whitehead ................ E01H 5/02 294/54.5
6,170,112 B1 * 1/2001 Mayfield .................. B25G 1/04 D32/50
6,199,245 B1 * 3/2001 Blessing .................. B25G 1/06 16/901
6,450,557 B1 * 9/2002 Martinez .................. B25G 3/26 294/51
6,485,031 B2 * 11/2002 Chen ........................ B25G 3/26 279/83
6,595,713 B1 * 7/2003 Wilson .................... F16B 7/042 403/328
6,644,702 B2 * 11/2003 Liou ........................ B25G 3/36 403/322.2
6,647,837 B2 * 11/2003 Liou ......................... B25F 1/00 81/463
6,671,930 B2 * 1/2004 Lanz ........................ B25G 3/04 403/321
6,715,211 B1 * 4/2004 Chi ........................... B25F 1/02 30/340
6,854,919 B2 * 2/2005 Neumann ................ B25G 3/18 403/326
6,925,686 B2 * 8/2005 Heathcock ............... B25G 1/04 16/427
7,025,015 B2 * 4/2006 Wilcox .................. A01K 91/08 114/255
7,096,530 B2 * 8/2006 Goulet ..................... B25G 1/04 15/230.11
7,540,058 B1 * 6/2009 Day ......................... B25G 1/04 16/427
7,587,791 B2 * 9/2009 Liou ........................ B25D 3/00 81/177.1
7,896,398 B2 * 3/2011 Suda ........................ B25G 3/10 482/35
8,322,764 B2 * 12/2012 Miller ...................... B25G 1/04 294/51
8,434,802 B2 * 5/2013 Lofley, Sr. ............... B25G 1/04 294/175
8,469,423 B1 * 6/2013 Crowley, Jr. ............ B25G 1/04 403/328
8,469,425 B1 * 6/2013 Lofley, Sr. ............... B25G 3/26 294/175
8,566,999 B1 * 10/2013 Casey .................. A46B 5/0083 15/146
8,683,657 B2 * 4/2014 Lin .......................... B25G 1/04 16/429
9,050,717 B2 * 6/2015 Mouch ..................... B25G 3/12
9,080,585 B2 * 7/2015 Lai .......................... F16B 7/105
9,205,549 B1 * 12/2015 Lin .......................... B25G 1/04
9,242,364 B1 * 1/2016 Cratty .................... B25G 1/043
9,259,834 B2 * 2/2016 Mouch ..................... B25G 1/04
9,731,409 B2 * 8/2017 Meinzer ................... B25G 1/04
10,245,719 B2 * 4/2019 Wood ....................... B25G 1/04
10,429,058 B2 * 10/2019 McKean .................. B25G 1/01
10,441,120 B1 * 10/2019 Sgroi, Jr. ................. B25G 1/04
10,465,365 B2 * 11/2019 Guthrie ................... E03C 1/308
10,537,223 B2 * 1/2020 Shin ......................... B25G 1/04
10,773,372 B2 * 9/2020 Jovanovich .............. B25G 3/36
10,793,410 B2 * 10/2020 Liou ........................ B65G 7/02
11,090,690 B1 * 8/2021 Rotanelli ................. B25G 3/36
11,370,104 B2 * 6/2022 Takada ..................... B25G 3/04
11,440,177 B2 * 9/2022 Sweitzer ................ A61B 17/92
11,472,015 B2 * 10/2022 Liou ....................... B25C 11/00
2003/0135950 A1 * 7/2003 Dove ....................... B25G 3/26 16/427
2004/0045416 A1 * 3/2004 Liou ........................ B25D 1/02 81/177.1
2004/0181904 A1 * 9/2004 Steltzer .................... B25G 1/04 16/110.1
2005/0179186 A1 * 8/2005 Genot ..................... F16B 7/042 269/37
2005/0238422 A1 * 10/2005 Hung ...................... F16B 7/042 403/379.4
2007/0003361 A1 * 1/2007 Wang ...................... F16B 7/105 403/109.3
2010/0054852 A1 * 3/2010 Snyder ..................... B25G 1/04 403/301
2010/0322740 A1 * 12/2010 Vestergaard-Jensen ..................... F16B 12/54 411/383
2011/0072940 A1 * 3/2011 Chang ................. B25B 23/0007 81/180.1
2013/0236237 A1 * 9/2013 Schmidt .................. F16B 7/042 403/109.3
2015/0258674 A1 * 9/2015 Steinick ................. B25G 1/102 16/427
2017/0239789 A1 * 8/2017 Sian ......................... H01K 3/32
2019/0118343 A1 * 4/2019 Aucoin .................... B25G 3/26
2021/0107132 A1 * 4/2021 Spinelli ................... F16B 7/182
2021/0363779 A1 * 11/2021 Bennett ................. E05B 1/0015
2022/0143794 A1 * 5/2022 Chen ..................... B25B 23/141
2022/0183897 A1 * 6/2022 McDowell ............... B25G 1/04
2023/0054432 A1 * 2/2023 Michon .................... B25G 1/04
2023/0063067 A1 * 3/2023 Lin ......................... F16B 7/105
2023/0234207 A1 * 7/2023 Resh ........................ B25G 3/18 81/489
2023/0241757 A1 * 8/2023 Billingsley .............. B25G 3/32 294/51
2023/0256584 A1 * 8/2023 Su ............................ B25G 1/04 254/12

* cited by examiner

TOOL WITH SEGMENTED TOOL HANDLE

BACKGROUND

The present invention relates to a tool and, more particular, to a tool with a segmented tool handle.

U.S. Publication No. 2004/0045416 provides a tool including a handle, a bit, and a locking device. The handle includes a socket defining a first tunnel, a second tunnel and at least one aperture through which the first tunnel is communicated with the second tunnel. The bit includes a working head formed at an end, a shank formed at an opposite end and a series of recesses defined in the shank. The shank can be inserted in the first tunnel. The locking device includes at least one ball detent and a latch. The at least one ball detent is put in the aperture. The latch extends in the second tunnel for pushing the ball detent into one of the recesses in a locking position and defining at least one notch for receiving the ball detent in a unfastened position.

However, the locking device achieves the locking effect through the engagement of the ball detent and the recess, but the ball detent can only be engaged with the recess through the elastic force of a spring. The engagement is affected by the elastic force of the spring. If the operator uses the tool with a too large force, the engagement of the ball detent and the recess will be reduced to cause ball detent unexpectedly changed from the locking position to the unfastened position.

Thus, a need exists for a tool to mitigate and/or obviate the above disadvantages.

SUMMARY

An objective of the present invention is to provide a tool with a segmented tool handle. The tool includes a first tube, a second tube and a limiting seat. The first tube is provided with a first inner hole extended along an axial direction thereof, and a first fastening hole extended along a radial direction thereof and communicated with the first inner hole. The second tube is provided with one end inserted into the first inner hole, a second inner hole extended along an axial direction thereof, and a second fastening hole extended along a radial direction thereof and communicated with the second inner hole. The limiting seat is disposed in the second inner hole and connected with a fastener. A distal end of the fastener is threadedly connected to the limiting seat, and a proximal end of the fastener is provided with an abutting portion with a conical surface. The fastener is configured to move between a fastened position and an unfastened position. The abutting portion passes through the second fastening hole and is inserted into the first fastening hole to abut against an inner periphery of first fastening hole when the fastener is in the fastened position. The abutting portion detaches from the first fastening hole when the fastener is in the unfastened position.

In an embodiment, the inner periphery of first fastening hole defines a fastening hole diameter along a radial direction of the fastener. The limiting seat is provided with a threaded hole. The distal end of the fastener is provided with a threaded portion threadedly connected to the threaded hole. The threaded portion and the abutting portion are respectively disposed on two opposite ends of the fastener. The abutting portion has a first end opposite to the threaded portion and the first end defines a first cone diameter along the radial direction of the fastener. The abutting portion further has a second end adjacent to the threaded portion and the second end defines a second cone diameter along the radial direction of the fastener. The fastening hole diameter is greater than the first cone diameter and less than the second cone diameter.

In an embodiment, the limiting seat is further provided with a containing hole communicated with the threaded hole. A diameter of the threaded hole is less than the second cone diameter. A shoulder portion is formed between the threaded hole and the containing hole. A stopping portion is formed between the abutting portion and the threaded portion. When the fastener is in the unfastened position, the stopping portion abuts against the shoulder portion, and the abutting portion is arranged in the containing hole and the second fastening hole.

In an embodiment, the proximal end of the fastener is provided with a driven slot adjacent to the abutting portion and having a non-circular cross-sectional shape.

In an embodiment, the first tube is further provided with a first positioning hole communicated with the first inner hole along the radial direction thereof. The second tube is further provided with a second positioning hole communicated with the second inner hole along the radial direction thereof. The limiting seat is further provided with a positioning aperture, and a positioning member and a biasing member are arranged in the positioning aperture. The positioning member is movable between a positioning position and a releasing position. The positioning member inserts through the first positioning hole and the second positioning hole when the positioning member is in the positioning position. The positioning member detaches from the first positioning hole when the positioning member is in the releasing position. When the fastener is in the unfastened position and the positioning member is in the releasing position, the second tube is detachable from the first tube, and one end of the biasing member abuts against a bottom of the positioning aperture and the other end of the biasing member abuts against the positioning member, and the biasing member biases the positioning member to the positioning position.

In an embodiment, the second positioning hole defines a positioning hole diameter. An outer periphery of the positioning member is provided with a wide section with a first outer diameter and a narrow section with a second outer diameter. The positioning hole diameter is greater than the second outer diameter and less than the first outer diameter. The narrow section passes through the second positioning hole. The wide section is permanently arranged in the positioning aperture.

In an embodiment, an outer periphery of the first tube is provided with an oblique recess connected to the first positioning hole. The oblique recess has an oblique surface being neither parallel nor perpendicular to the first tube.

In an embodiment, the limiting seat is assembled in the second inner hole in a tightly fitting manner.

In an embodiment, the tool further includes a tool head being a prying tool head. One end of the first tube opposite to the second tube has a hexagonal tube structure to sleeve with the tool head.

In another embodiment, the tool further includes a first tool head and a second tool head. One end of the first tube opposite to the second tube has a round tube structure to sleeve with the first tool head. One end of the second tube opposite to the first tube has a round tube structure to sleeve with the second tool head.

The present invention will become clearer in light of the following detailed description of illustrative embodiments of this invention described in connection with the drawings.

DETAILED DESCRIPTION

Figure 1:
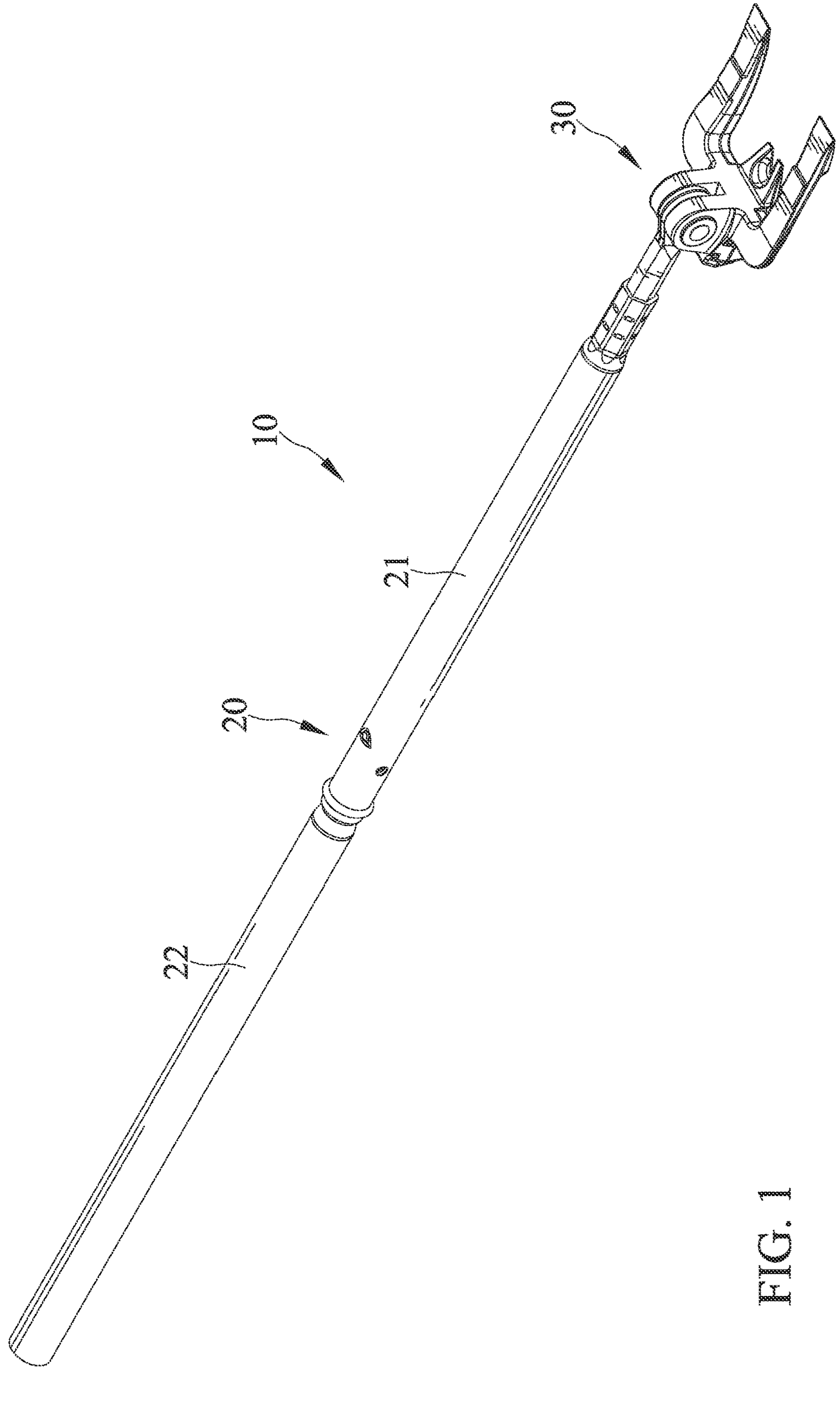
FIG. 1 is a perspective view of a tool with a segmented tool handle of a first embodiment according to the present invention.
Figure 2:
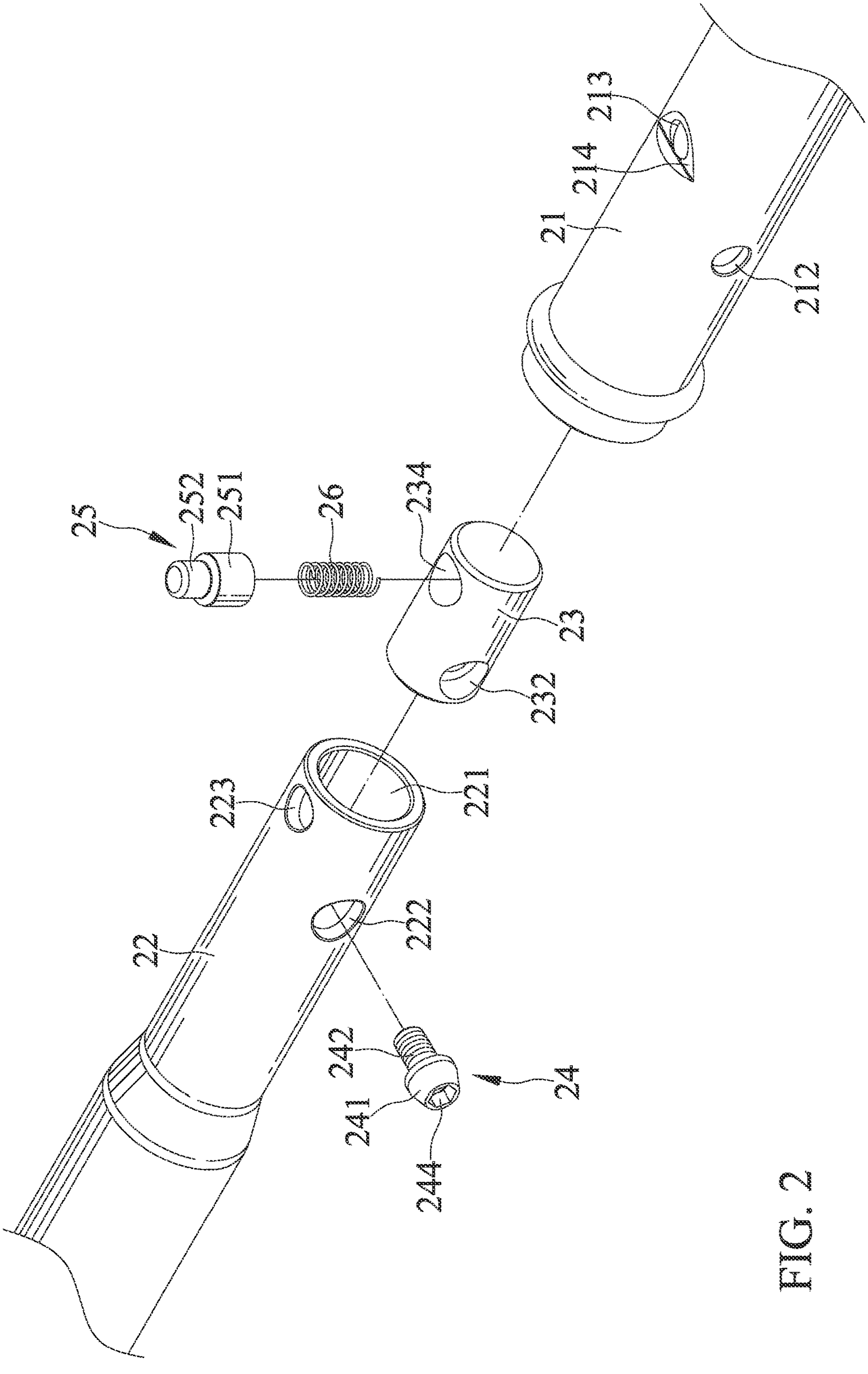
FIG. 2 is an exploded perspective view of the tool of FIG. 1.
Figure 3:
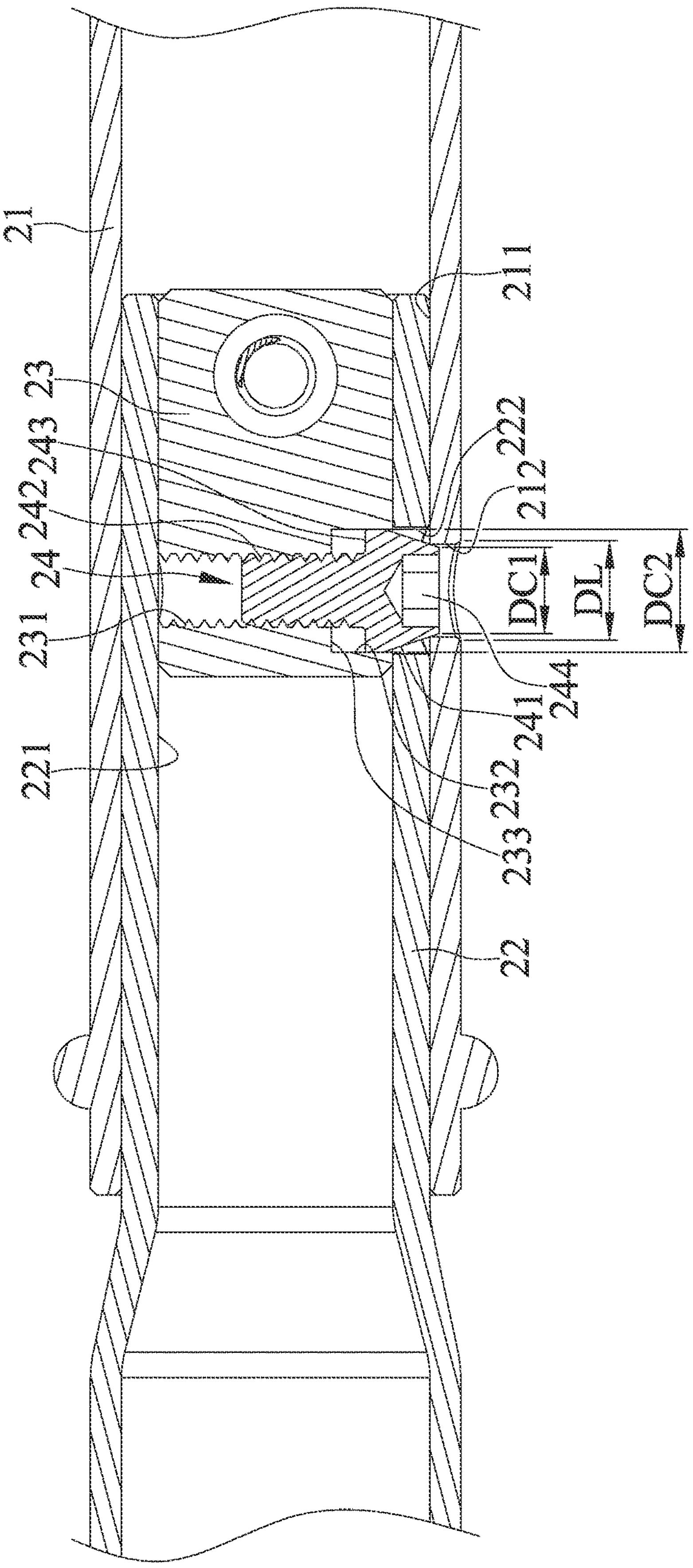
FIG. 3 is a cross sectional view of the tool of FIG. 1 and shows the fastener disposed in the fastened position.
Figure 4:
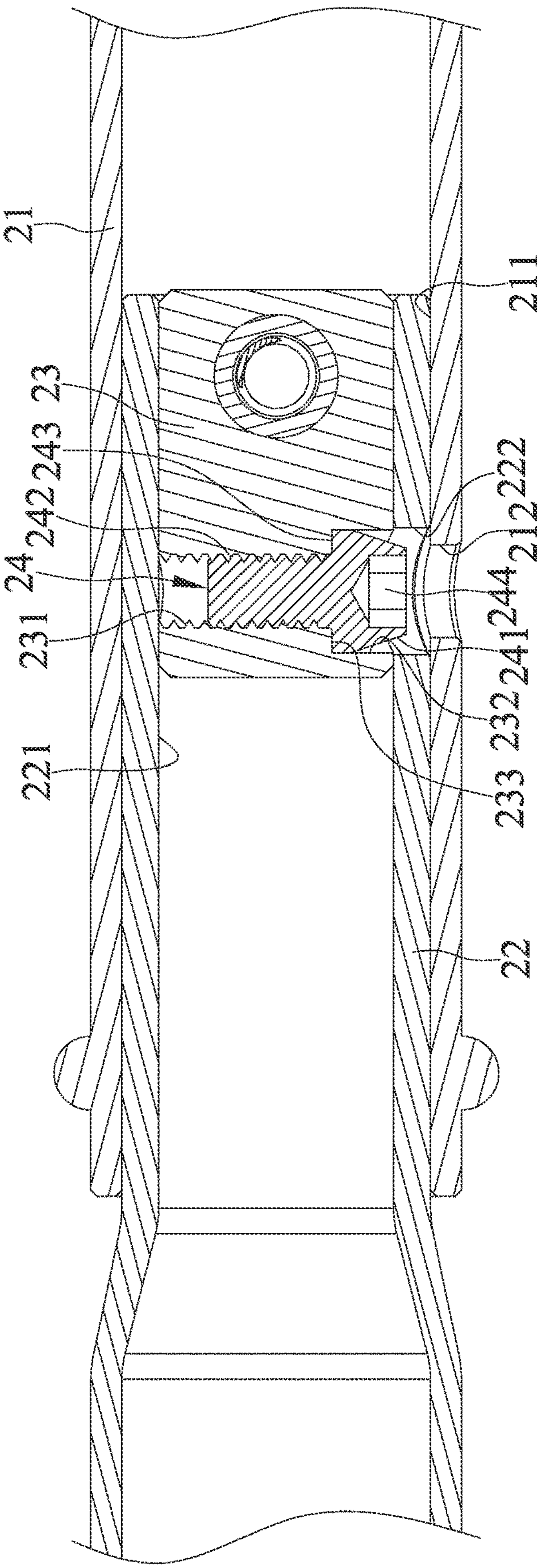
FIG. 4 is a continued view of FIG. 3 and shows the fastener disposed in the unfastened position.
Figure 5:
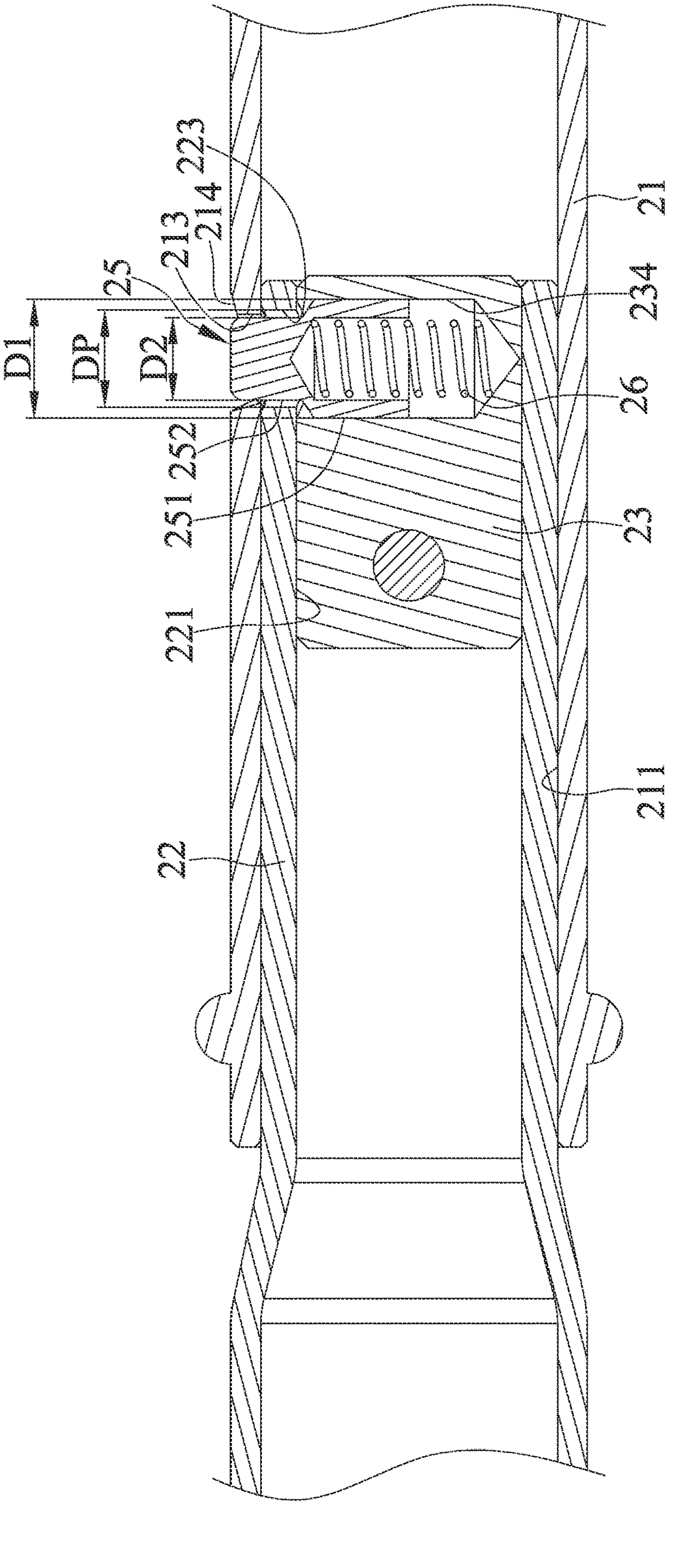
FIG. 5 is another cross sectional view of the tool of FIG. 1 and shows the positioning member disposed in the positioning position.
Figure 6:
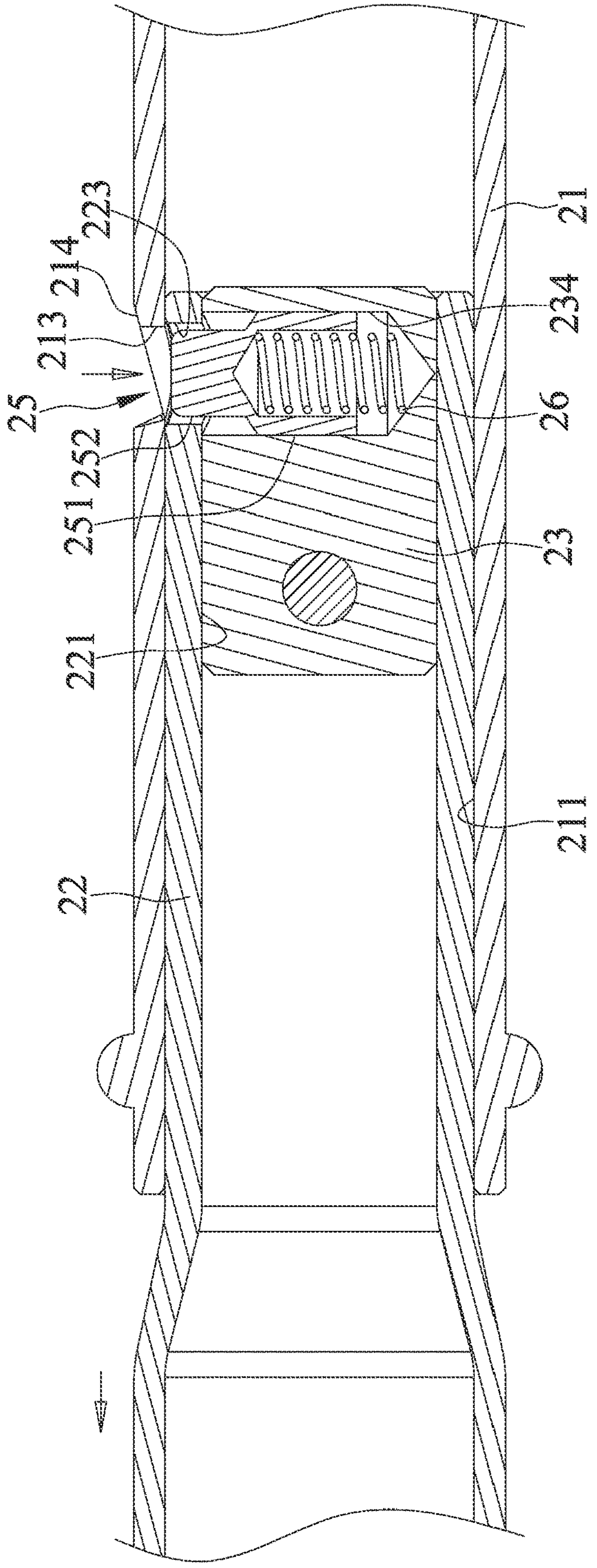
FIG. 6 is a continued view of FIG. 5 and shows the positioning member disposed in the releasing position.

FIGS. 1-6 show a tool 10 of a first embodiment according to the present invention. The tool 10 includes a segmented tool handle 20 and a tool head 30.

The segmented tool handle 20 includes a first tube 21, a second tube 22 and a limiting seat 23. The first tube 21 is provided with a first inner hole 211 extended along an axial direction thereof, and a first fastening hole 212 extended along a radial direction thereof and communicated with the first inner hole 211. The second tube 22 is provided with one end inserted into the first inner hole 211, a second inner hole 221 extended along an axial direction thereof, and a second fastening hole 222 extended along a radial direction thereof and communicated with the second inner hole 221. The limiting seat 23 is disposed in the second inner hole 221 and connected with a fastener 24. A distal end of the fastener 24 is threadedly connected to the limiting seat 23, and a proximal end of the fastener 24 is provided with an abutting portion 241 with a conical surface. The fastener 24 is configured to move between a fastened position and an unfastened position. The abutting portion 241 passes through the second fastening hole 222 and is inserted into the first fastening hole 212 to abut against an inner periphery of first fastening hole 212 when the fastener 24 is in the fastened position. The abutting portion 241 detaches from the first fastening hole 212 when the fastener 24 is in the unfastened position.

Further, the inner periphery of first fastening hole 212 defines a fastening hole diameter DL along a radial direction of the fastener 24. The limiting seat 23 is provided with a threaded hole 231. The distal end of the fastener 24 is provided with a threaded portion 242 threadedly connected to the threaded hole 231. The threaded portion 242 and the abutting portion are respectively disposed on two opposite ends of the fastener 24. The 6 abutting portion 241 has a first end opposite to the threaded portion 242, and the first end defines a first cone diameter DC1 along the radial direction of the fastener 24. The abutting portion 241 further has a second end adjacent to the threaded portion 242, and the second end defines a second cone diameter DC2 along the radial direction of the fastener 24. The fastening hole diameter DL is greater than the first cone diameter DC1 and 12 less than the second cone diameter DC2.

The limiting seat 23 is further provided with a containing hole 232 communicated with the threaded hole 231. A diameter of the threaded hole 231 is less than the second cone diameter DC2. A shoulder portion 233 is formed between the threaded hole 231 and the containing hole 232, and a stopping portion 243 is formed between the abutting portion 241 and the threaded portion 242. When the fastener 24 is in the unfastened position, the stopping portion 243 abuts against the shoulder portion 233, and the abutting portion 241 is arranged in the containing hole 232 and the second fastening hole 222.

An end face of the proximal end of the fastener 24 is provided with a driven slot 244 adjacent to the abutting portion 241 and having a non-circular cross-sectional shape.

The first tube 21 is further provided with a first positioning hole 213 communicated with the first inner hole 211 along the radial direction thereof. The second tube 22 is further provided with a second positioning hole 223 communicated with the second inner hole 221 along the radial direction thereof. The limiting seat 23 is further provided with a positioning aperture 234, and a positioning member 25 and a biasing member 26 are arranged in the positioning aperture 234. The positioning member 25 is movable between a positioning position and a releasing position. The positioning member 25 inserts through the first positioning hole 213 and the second positioning hole 223 when the positioning member 25 is in the positioning position. The positioning member 25 detaches from the first positioning hole 213 when the positioning member 25 is in the releasing position.

Further, when the fastener 24 is in the unfastened position and the positioning member 25 is in the releasing position, the second tube 22 is detachable from the first tube 21, and one end of the biasing member 26 abuts against a bottom of the positioning aperture 234 and the other end of the biasing member 26 abuts against the positioning member 25. The biasing member 26 biases the positioning member 25 to the positioning position.

Furthermore, the second positioning hole 223 defines a positioning hole diameter DP. An outer periphery of the positioning member 25 is provided with a wide section 251 with a first outer diameter D1 and a narrow section 252 with a second outer diameter D2. The positioning hole diameter DP is greater than the second outer diameter D2 and less than the first outer diameter D1. The narrow section 252 passes through the second positioning hole 223, and the wide section 251 is permanently arranged in the positioning aperture 234.

An outer periphery of the first tube 21 is provided with an oblique recess 214 connected to the first positioning hole 213, and the oblique 8 recess 214 has an oblique surface being neither parallel nor perpendicular to the first tube 21.

In the embodiment, the limiting seat 23 may be assembled in the second inner hole 221 in a tightly fitting manner. The tool head 30 may be a prying tool head, and one end of the first tube 21 opposite to the second tube 22 has a hexagonal tube structure to sleeve with the tool head 30.

Thus, the handle 20 provides a good combination and fixation effect for the first tube 21 and the second tube 22 without shaking or instability at the junction.

Figure 7:
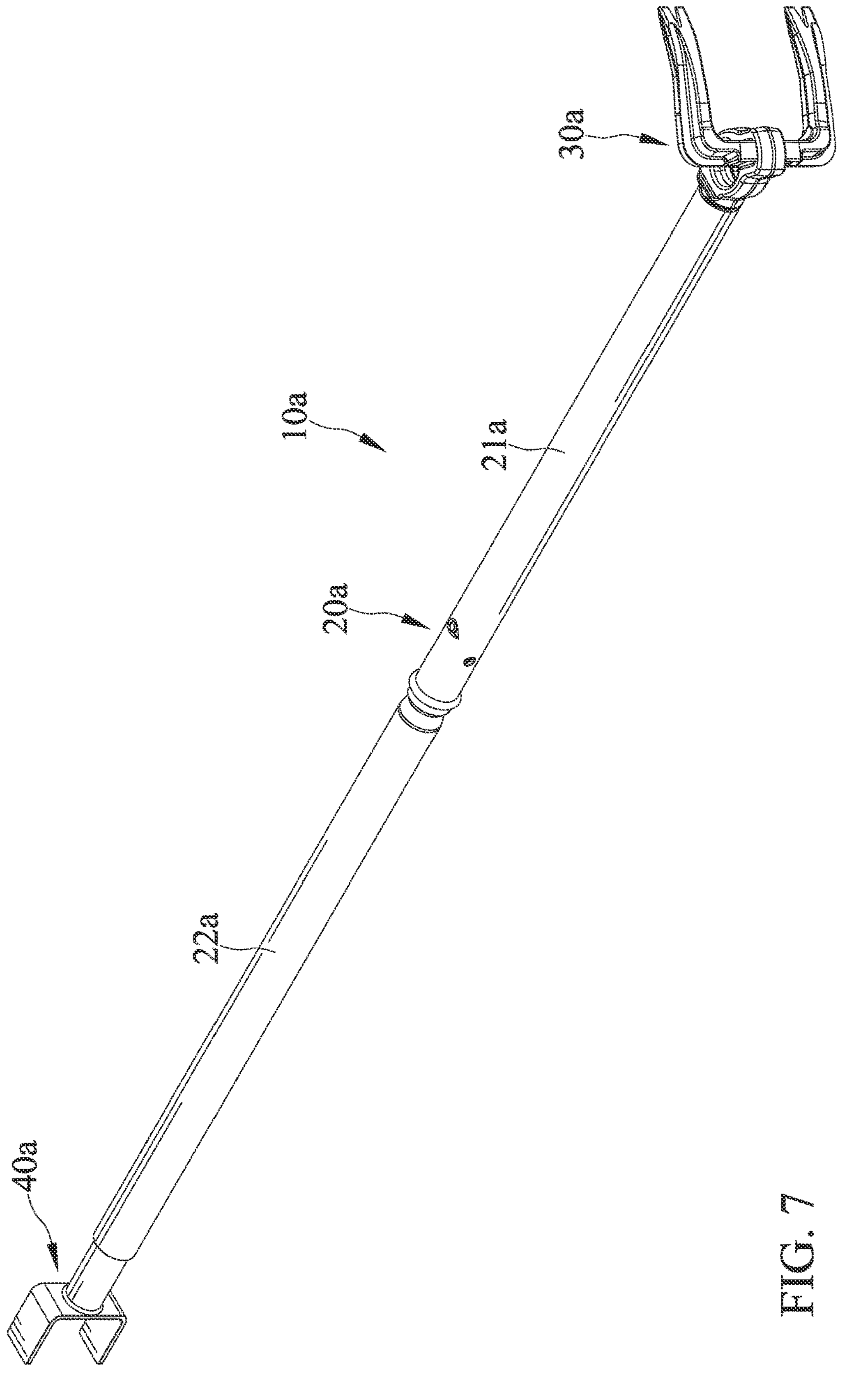
FIG. 7 is a perspective view of a tool with a segmented tool handle of a second embodiment according to the present invention.

FIG. 7 shows a tool **10*a* of a second embodiment according to the present invention. The second embedment is substantially the same as the first embodiment. The main differences are that the tool 10*a* includes a handle 20*a*, a first tool head 30*a* and a second tool head 40*a*. One end of the first tube 21*a* opposite to the second tube 22*a* has a round tube structure to sleeve with the first tool head 30*a*, and one end of the second tube 22*a* opposite to the first tube 21*a* has a round tube structure to sleeve with the second tool head 40*a***.

Although specific embodiments have been illustrated and described, numerous modifications and variations are still possible without departing from the scope of the invention. The scope of the invention is limited by the accompanying claims.

The invention claimed is:

1. A tool with a segmented tool handle comprising:

a first tube provided with a first inner hole extended along an axial direction thereof, and a first fastening hole extended along a radial direction thereof and communicated with the first inner hole;

a second tube provided with one end inserted into the first inner hole, a second inner hole extended along an axial direction thereof, and a second fastening hole extended along a radial direction thereof and communicated with the second inner hole; and a limiting seat disposed in the second inner hole and connected with a fastener, wherein a distal end of the fastener is threadedly connected to the limiting seat and a proximal end of the fastener is provided with an abutting portion with a conical surface, wherein the fastener is configured to move between a fastened position and an unfastened position, wherein the abutting portion passes through the second fastening hole and is inserted into the first fastening hole to abut against an inner periphery of the first fastening hole when the fastener is in the fastened position, and wherein the abutting portion detaches from the first fastening hole when the fastener is in the unfastened position;

wherein the first tube is further provided with a first positioning hole communicated with the first inner hole along the radial direction thereof, wherein the second tube is further provided with a second positioning hole communicated with the second inner hole along the radial direction thereof, wherein the limiting seat is further provided with a positioning aperture, and a positioning member and a biasing member are arranged in the positioning aperture, wherein the positioning member is movable between a positioning position and a releasing position, wherein the positioning member inserts through the first positioning hole and the second positioning hole when the positioning member is in the positioning position, wherein the positioning member detaches from the first positioning hole when the positioning member is in the releasing position, wherein when the fastener is in the unfastened position and the positioning member is in the releasing position, the second tube is detachable from the first tube, and one end of the biasing member abuts against a bottom of the positioning aperture and the other end of the biasing member abuts against the positioning member, and the biasing member biases the positioning member to the positioning position.

2. The tool as claimed in claim 1, wherein the inner periphery of first fastening hole defines a fastening hole diameter along a radial direction of the fastener, wherein the limiting seat is provided with a threaded hole, wherein the distal end of the fastener is provided with a threaded portion threadedly connected to the threaded hole, wherein the threaded portion and the abutting portion are respectively disposed on two opposite ends of the fastener, wherein the abutting portion has a first end opposite to the threaded portion and the first end defines a first cone diameter along the radial direction of the fastener, wherein the abutting portion further has a second end adjacent to the threaded portion and the second end defines a second cone diameter along the radial direction of the fastener, and wherein the fastening hole diameter is greater than the first cone diameter and less than the second cone diameter.

3. The tool as claimed in claim 2, wherein the limiting seat is further provided with a containing hole communicated with the threaded hole, wherein a diameter of the threaded hole is less than the second cone diameter, wherein a shoulder portion is formed between the threaded hole and the containing hole, wherein a stopping portion is formed between the abutting portion and the threaded portion, wherein when the fastener is in the unfastened position, the stopping portion abuts against the shoulder portion, and the abutting portion is arranged in the containing hole and the second fastening hole.

4. The tool as claimed in claim 1, wherein the proximal end of the fastener is provided with a driven slot adjacent to the abutting portion and having a non-circular cross-sectional shape.

5. The tool as claimed in claim 1, wherein the second positioning hole defines a positioning hole diameter, wherein an outer periphery of the positioning member is provided with a wide section with a first outer diameter and a narrow section with a second outer diameter, wherein the positioning hole diameter is greater than the second outer diameter and less than the first outer diameter, wherein the narrow section passes through the second positioning hole, and wherein the wide section is permanently arranged in the positioning aperture.

6. The tool as claimed in claim 1, wherein an outer periphery of the first tube is provided with an oblique recess connected to the first positioning hole, and wherein the oblique recess has an oblique surface being neither parallel nor perpendicular to the axial direction of the first tube.

7. The tool as claimed in claim 1, wherein the limiting seat is assembled in the second inner hole in a tightly fitting manner.

8. The tool as claimed in claim 1, further comprising:

a tool head being a prying tool head; wherein one end of the first tube opposite to the second tube has a hexagonal tube structure to sleeve with the tool head.

9. The tool as claimed in claim 1, further comprising:

a first tool head; wherein one end of the first tube opposite to the second tube has a round tube structure to sleeve with the first tool head; and a second tool head; wherein one end of the second tube opposite to the first tube has a round tube structure to sleeve with the second tool head.

* * * * *